(No Model.) 2 Sheets—Sheet 1.

A. W. OBERMANN.
CULINARY VESSEL.

No. 528,382. Patented Oct. 30, 1894.

WITNESSES:
C. L. Resse
B. F. Thornett

INVENTOR
August W. Obermann
BY
Evert & Appleman
ATTORNEYS.

THE NORRIS PETERS CO., PHOTO-LITHO., WASHINGTON, D. C.

(No Model.) 2 Sheets—Sheet 2.
A. W. OBERMANN.
CULINARY VESSEL.
No. 528,382. Patented Oct. 30, 1894.
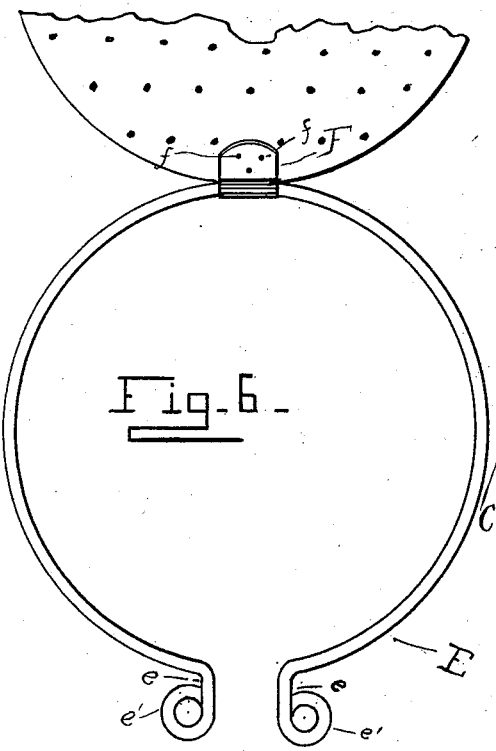
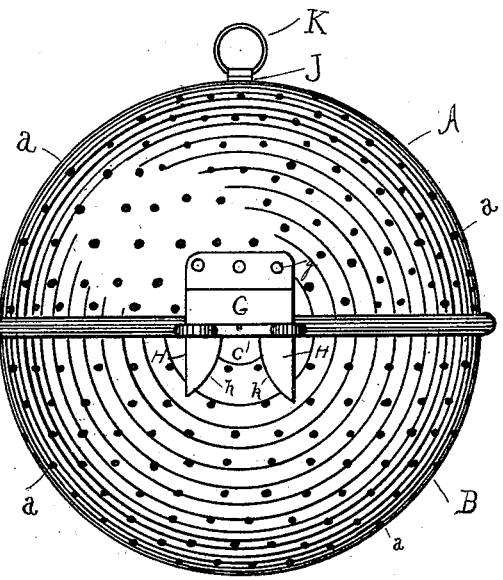
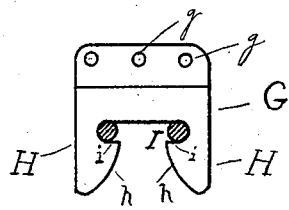
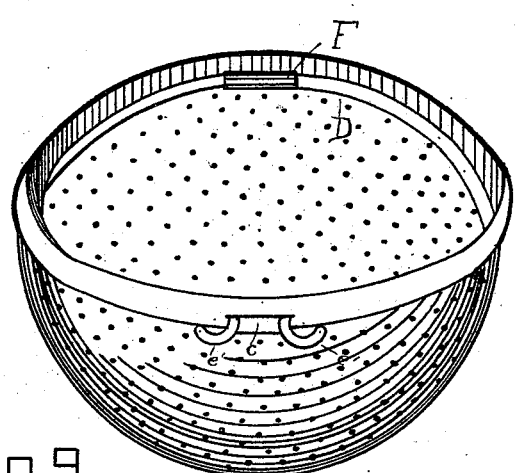
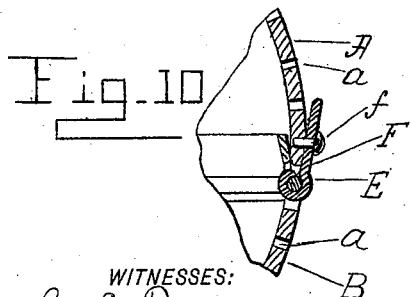
WITNESSES:
C. L. Resse.
B. F. Thornett
INVENTOR
August W. Obermann
BY
Evert & Appleman
ATTORNEYS.

UNITED STATES PATENT OFFICE.

AUGUST W. OBERMANN, OF PITTSBURG, PENNSYLVANIA.

CULINARY VESSEL.

SPECIFICATION forming part of Letters Patent No. 528,382, dated October 30, 1894.

Application filed July 22, 1893. Serial No. 481,241. (No model.)

*To all whom it may concern:*

Be it known that I, AUGUST W. OBERMANN, a citizen of the United States of America, residing at Pittsburg, in the county of Allegheny and State of Pennsylvania, have invented certain new and useful Improvements in Culinary Vessels, of which the following is a specification, reference being had to the accompanying drawings.

This invention relates to certain new and useful improvements in culinary vessels; and more particularly to that class adapted and designed for cooking, boiling, or steaming.

The invention has for its object to provide novel means whereby victuals may be easily cooked or boiled without the slightest danger of burning or scorching the same; furthermore, that the articles cooked in this manner may be easily strained and taken out of the boiling water; a further object of the invention being, that the device can be conveniently changed from a cooker to a steamer.

This invention has for its still further object, the novel construction and arrangement of a locking device employed and operating in conjunction with vessels of the class as heretofore mentioned. When victuals are being cooked they will expand or swell, and for this reason a substantial lock placed on vessels of this class will greatly add to the culinary art.

This invention consists in a perforated culinary vessel of almost any desired form, composed of two sections hinged together on one side, and retained in position by means of the locking device on the other; furthermore, the adjustable supports or legs affording the means whereby the vessel is converted from a cooker into a steamer, as will be hereinafter explained.

The invention finally consists in the novel construction, combination and arrangement of parts, to be hereinafter more particularly described and specifically pointed out in the claims.

Figure 1:
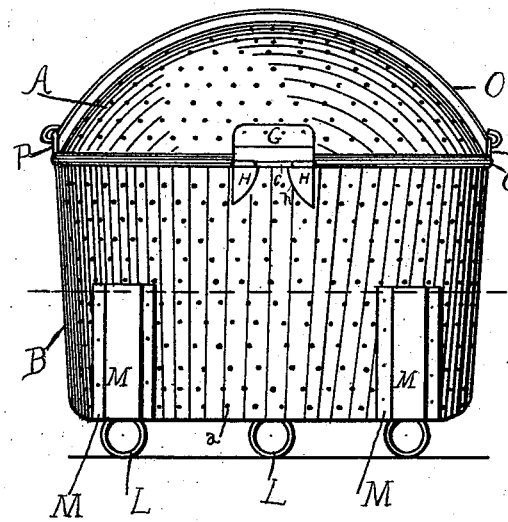
Figure 2:
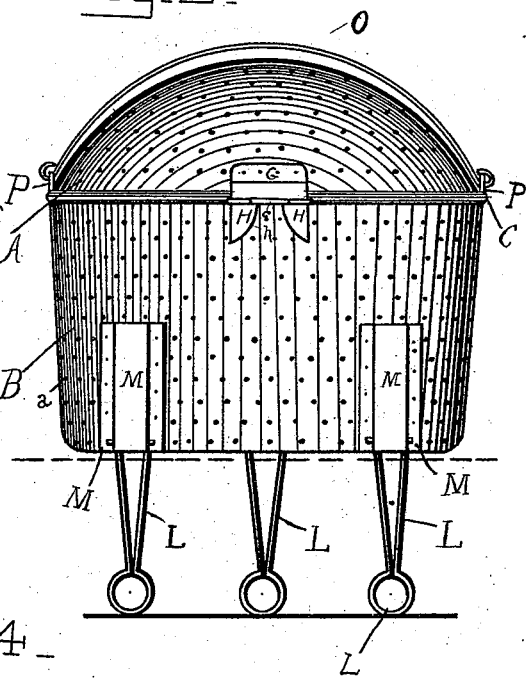
Figures 3, 4:
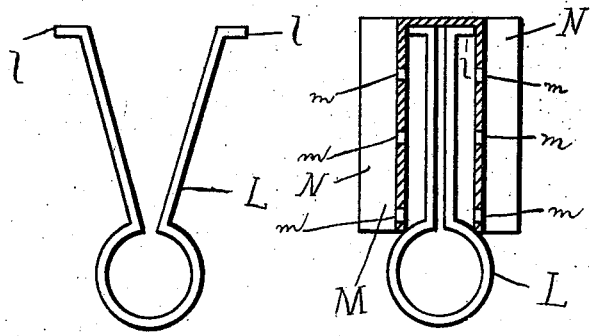
Figure 5:
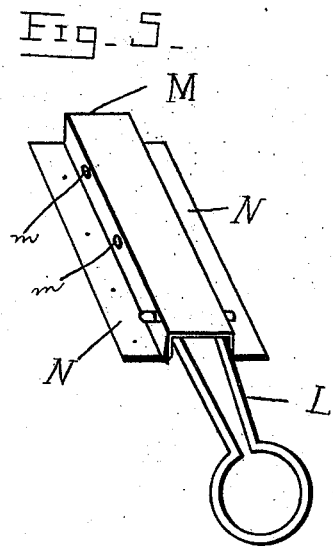

Referring to the accompanying drawings forming a part of this specification wherein like letters of reference indicate similar parts throughout the different views:—Figure 1— is a front elevation of my improved vessel, showing the water filling the vessel about one half, and the legs or supports arranged at their minimum adjustment. Fig. 2 is a similar view with the supports extended to their maximum adjustment, with the body of the vessel or steamer above the surface of the water. Fig. 3 is a detail view of one of the supports. Fig. 4—is a vertical sectional view of the guide inclosing the support or leg. Fig. 5— is a view in perspective of the guide showing the support extended to its maximum degree. Fig. 6— is a plan view of the spring, forming a part of the locking device and hinge. Fig. 7—is a front view of a cooker representing the invention in a modified form. Fig. 8— is a detail view of the clasp or staple constituting a part of the spring-pressed lock, the ends of the spring being shown in section. Fig. 9, is a perspective view of the lower hemispherical portion of the cooker and more clearly illustrating the position of the spring. Fig. 10 is a detail section of the hinged connection of the upper and lower sections.

In the drawings:—A, represents the lid or top section of the vessel; B, the lower body portion; $a, a, a, a$, the series of perforations; C, the annular flange on the body portion and $c$, the slot.

D, represents the annular groove formed in the lower portion B, of the vessel, said groove forming a seat for the spring, E, the ends of the spring being passed through the slot $c$, and bent at $e, e$, almost at right angles, with its free ends coiled as shown at $e', e'$.

F, represents the hinge embracing and operating on the spring E, said hinge being secured by means of rivets $f, f$, to the portion A.

G, represents the clamp or staple rigidly attached by the rivets $g, g$, to the portion A, near its base, and directly above the slot $c$ of the portion B. This clamp has downwardly extending pieces H, H, its inner sides graduated or inclined as shown at $h, h$, and a transverse slot I, forming shoulders $i, i$, J, the staple at the top of cooker, for the reception of the ring K.

L, L, L, represent the adjustable supports having its ends bent outwardly as shown at $l, l$.

M, M, M, are the guides in which the supports operate. Said guides are provided with apertures $m, m, m$, for the reception of the parts $l, l$, of the legs L.

N, N, are the flanges of the guides M, for the purpose of securement of the guides to the sides of the vessel.

O, represents the bail and P, P, the bail ears.

For the purpose of clearly illustrating this invention, only two different designs of vessels have been shown, yet it will be understood that the invention applies to any form of vessel containing two sections.

This cooker or steamer may be made of any suitable material, but preferably of that which is known as "enameled ware."

Operation: For example; when it is desired to cook rice, oatmeal and the like, the products are placed in the interior of the vessel. The two hinged sections are then brought together, a slight pressure exercised thus forcing the staple over the spring ends as they ride up toward the slot. When this point is reached the spring ends retract, and are lodged firmly in position. By this operation the vessel is securely locked; the next step being, to place it in a vessel containing boiling water, and after the victuals have cooked a sufficient length of time, the vessel is lifted out of the water, and at the same time the articles are drained as will be apparent. The spring-pressed ends are then pressed together to a point beyond the shoulders, and the parts A and B, drawn in opposite direction, thus unlocking the vessel, the cooked articles being then ready for use. The legs or supports will prevent the body of the vessel from coming into direct contact with the bottom of the vessel containing the boiling water and by this means burning or scorching of the cooking articles will be impossible.

The above described operation applies to cooking, and when it is desired to steam the victuals or retain them in a heated condition after being cooked, the adjustable supports are extended to the desired length, which brings the body of the vessel above the water's surface, as shown in Fig. 2 of the drawings, and the articles are in this manner steamed, as will be readily understood.

This improved form of vessel contains an additional advantage when used for boiling bouillon or broth, inasmuch when the cooker containing the substance is lifted out of the vessel the bouillon is perfectly clear.

It will be particularly noted, that this invention should not be limited to its specific construction, but that various changes can be made in its details without departing materially from the general idea involved.

Having fully described my invention, what I claim as new, and desire to secure by Letters Patent, is—

1. In a cooking vessel the combination of two perforated sections the lower one having a slot and an annular groove, and the upper one being provided with a clamp having a slot and inclines leading thereto, a spring seated in the annular groove and provided with a hinge to which the sections are secured, the ends of said springs adapted to fit in the slot of the clamp to lock the parts together.

2. A cooking vessel consisting of two sections attached to a spring, said spring coacting with a clamp to secure the sections in a closed position substantially as described.

In testimony whereof I affix my signature in presence of two witnesses.

AUGUST W. OBERMANN.

Witnesses:
H. C. EVERT,
H. E. SEIBERT.